US011119584B2

(12) United States Patent
Mickelsen et al.

(10) Patent No.: US 11,119,584 B2
(45) Date of Patent: Sep. 14, 2021

(54) SYSTEMS AND METHODS FOR DETECTING AND RESPONDING TO USER FRUSTRATION WITH ELECTRONIC DEVICES

(71) Applicant: DISH Technologies L.L.C., Englewood, CO (US)

(72) Inventors: Jeremy Stephen Mickelsen, Denver, CO (US); Frederick Gayen Vigo, Aurora, CO (US); Jackson Louie, Aurora, CO (US)

(73) Assignee: DISH Technologies L.L.C., Englewood, CO (US)

( * ) Notice: Subject to any disclaimer, the term of this patent is extended or adjusted under 35 U.S.C. 154(b) by 617 days.

(21) Appl. No.: 15/368,011

(22) Filed: Dec. 2, 2016

(65) Prior Publication Data

US 2018/0157343 A1   Jun. 7, 2018

(51) Int. Cl.
| | | |
|---|---|---|
| *G06F 3/0346* | (2013.01) | |
| *H04N 21/442* | (2011.01) | |
| *H04N 21/4425* | (2011.01) | |
| *G06F 9/451* | (2018.01) | |
| *G06F 3/01* | (2006.01) | |

(52) U.S. Cl.
CPC ............ *G06F 3/0346* (2013.01); *G06F 3/017* (2013.01); *G06F 9/453* (2018.02); *H04N 21/4425* (2013.01); *H04N 21/44218* (2013.01)

(58) Field of Classification Search
CPC ........ G06F 3/017; G06F 3/167; G06F 3/0346; G06F 3/038; G06F 3/0487; G06F 9/4446; G06F 9/00335; G06F 11/2247; G06F 2200/1636; G10L 25/63; A61B 5/165; A61B 5/742; A63F 2300/105; G06T 7/20; G08B 21/043; H04M 2250/12
See application file for complete search history.

(56) References Cited

U.S. PATENT DOCUMENTS

| | | | | |
|---|---|---|---|---|
| 2006/0008116 | A1* | 1/2006 | Kiraly | ........................ G06T 7/20 382/103 |
| 2006/0279542 | A1* | 12/2006 | Flack | ..................... G06F 1/1626 345/158 |
| 2008/0165022 | A1* | 7/2008 | Herz | ........................ G06F 3/017 340/669 |
| 2008/0189578 | A1* | 8/2008 | Raghuraman | ......... G06F 11/004 714/47.1 |
| 2009/0184849 | A1* | 7/2009 | Nasiri | .................... G06F 3/0346 341/20 |
| 2009/0201168 | A1* | 8/2009 | Liu | ........................ G06F 3/0346 340/4.31 |

(Continued)

*Primary Examiner* — Parul H Gupta
(74) *Attorney, Agent, or Firm* — Seed IP Group LLP

(57) ABSTRACT

In various embodiments, a user frustration monitoring and control system may be part of or otherwise be operably coupled to a device to detect and respond to user frustration with the device or with other components in communication with the device. A user frustration monitoring and control system may detect when, out of frustration, a user jars or hits a set-top box or other device in communication with the set-top box, such as a remote-control device or monitor, and will perform an action to address the detected user frustration. This action may be, for example, performing a diagnostic action and/or communicating a helpful message or instructions to the user.

3 Claims, 6 Drawing Sheets

(56) References Cited

U.S. PATENT DOCUMENTS

2012/0068845 A1\* 3/2012 Kruglick ................. G06F 3/017
340/540
2015/0194040 A1\* 7/2015 Fiedler .................... H04W 4/70
340/870.09

\* cited by examiner

SYSTEMS AND METHODS FOR DETECTING AND RESPONDING TO USER FRUSTRATION WITH ELECTRONIC DEVICES

TECHNICAL FIELD

The technical field relates to electronic devices and, more particularly, to detecting and responding to user frustration with electronic devices.

BRIEF SUMMARY

Some users slap, hit, or otherwise jar devices such as electrical equipment including, for example, televisions and set-top boxes, when these devices are not performing to expectations. Although it is unlikely to improve operation on most modern equipment, detecting the jarring events may be used as described herein to trigger operations in the device for diagnostics, user education and other corrective actions.

In one embodiment, a user frustration monitoring and control system may be part of or otherwise operably coupled to an electronic device such as a receiving device to detect and respond to user frustration with the receiving device or with other components in communication with the receiving device. For example, the user frustration monitoring and control system may detect when, out of frustration, a user jars or hits the receiving device or other electronic devices in communication with the receiving device, such as a remote-control device or monitor, and will perform an action to address the detected user frustration. This action may be, for example, performing a diagnostic action and/or communicating a helpful message or instructions to the user.

In some embodiments, there may be a plurality of user frustration monitoring and control systems affixed to respective devices that each may communicate detection of user frustration and/or diagnostic data to a remote monitoring system, content provider, program distributor or other information provider over a communications network such as the Internet. This communication may be to determine existence of a systemic problem related to a plurality of electronic devices within a particular customer premises, service area, city or geographical region.

BRIEF DESCRIPTION OF THE DRAWINGS

The components in the drawings are not necessarily to scale relative to each other. Like reference numerals designate corresponding parts throughout the several views.

DETAILED DESCRIPTION

Figure 1:
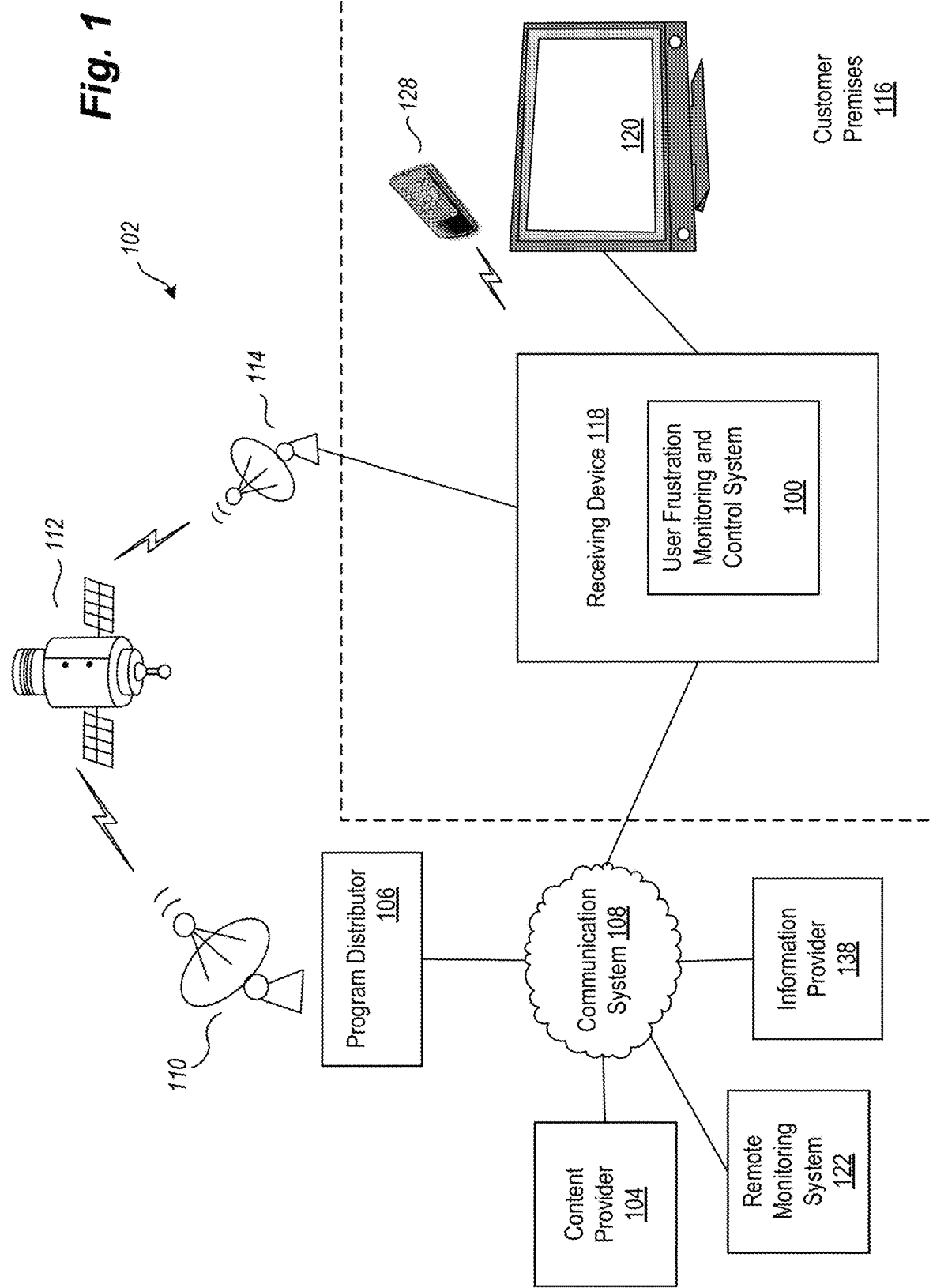
FIG. 1 is a block diagram illustrating an example content distribution environment in which embodiments of systems and methods for detecting and responding to user frustration with electronic devices may be implemented.

FIG. 1 is an overview block diagram illustrating an example content distribution environment 102 in which embodiments of systems and methods for detecting and responding to user frustration with electronic devices may be implemented. A user frustration monitoring and control system 100 may be part of or otherwise operably coupled to an electronic device such as a receiving device 118 (e.g., on a customer premises 116) to detect and respond to user frustration with the receiving device 118 or with other components in communication with the receiving device 118. For example, the user frustration monitoring and control system 100 may detect when out of frustration a user jars or hits the receiving device 118 or other electronic devices in communication with the receiving device 118, such as remote-control device 128 or presentation device 120, and will perform an action to address the detected user frustration. This action may be, for example, performing a diagnostic action and/or communicating a helpful message or instructions to the user.

The user frustration monitoring and control system 100 may also be operably connected to a communications system 108 to send and receive information regarding the diagnostic testing and monitoring of the receiving device 118 and/or other electronic devices in communication with the receiving device 118, and configuration information regarding the receiving device 118 and/or other electronic devices in communication with the receiving device 118. The sending and receiving of such information via the communications system 108 may be part of an action the receiving device 118 performs to address the detected user frustration. Also, such information sent and received via the communications system 108 may be used by the receiving device 118 to aid in performing an action to address the detected user frustration. The user frustration monitoring and control system 100 may control the receiving device 118 and may also provide control of a testing environment or conditions. For example, the user frustration monitoring and control system 100 may control satellite signal levels input to the receiving device 118, control and vary AC voltages to the receiving device 118, capture video or audio data input to or output from the receiving device 118, control operation of the receiving device 118 via commands generated by the user frustration monitoring and control system, etc. In some embodiments, the user frustration monitoring and control system 100 reports performance data of the receiving device 118, or other electronic devices in communication with the receiving device 118, over the communication system 108 to a remote monitoring system 122 and may also perform analysis of the performance data and any captured video or audio data from the receiving device 118. The user frustration monitoring and control system 100 may also request additional analysis from the monitoring system 122 over the communication system 108. This allows the user frustration monitoring and control system 100 to be remotely located from the monitoring system 122. The remote monitoring system 122 may be that of the content provider 104, program distributor 106, information provider 138, receiving device 118 manufacturer (not shown) or other entity or third party.

The remote monitoring system 122 may also be a centralized monitoring system for multiple electronic devices, such as, for example, multiple receiving devices, at various remote locations, each receiving device 118 having a corresponding user frustration monitoring and control system in operable communications with the communication system 108. The remote monitoring system 122 may also provide further analysis of performance information sent from the user frustration monitoring and control system 100 of the receiving device 118 or from other user frustration monitoring and control systems of other remote receiving devices. Before providing additional details regarding the operation and constitution of the user frustration monitoring and control system 100, the example content distribution environment 102, within which the user frustration monitoring and control system 100 may operate, will briefly be described.

In the content distribution environment 102, audio, video, and/or data service providers, such as, but not limited to, television service providers, provide their customers a multitude of video and/or data programming (hereafter, collectively and/or exclusively "programming"). Such programming is often provided by use of a receiving device communicatively coupled to a presentation device 120 configured to receive the programming.

The receiving device 118 interconnects to one or more communications media or sources (such as a cable head-end, satellite antenna, telephone company switch, Ethernet portal, off-air antenna, or the like) that provide the programming. The receiving device 118 commonly receives a plurality of programming by way of the communications media or sources described in greater detail below. Based upon selection by a user, the receiving device 118 processes and communicates the selected programming to the presentation device 120.

For example, the receiving device 118 may be a "television converter," "receiver," "set-top box," "television receiving device," "television receiver," "television recording device," "satellite set-top box," "satellite receiver," "cable set-top box," "cable receiver," "media player," and/or "television tuner." Accordingly, the receiving device 118 may be any suitable converter device or electronic equipment that is operable to receive or playback programming. Further, the receiving device 118 may itself include user interface devices, such as buttons or switches. In many applications, a remote-control device ("remote") 128 is operable to control the receiving device 118 and/or the presentation device 120. The remote 128 typically communicates with the receiving device 118 using a suitable wireless medium, such as infrared ("IR"), radio frequency ("RF"), or the like. The user frustration monitoring and control system 100 may also have such wireless functionality to communicate with and/or control other electronic devices remotely.

Examples of a presentation device 120 include, but are not limited to, a television ("TV"), a personal computer ("PC"), a sound system receiver, a digital video recorder ("DVR"), a compact disk ("CD") device, game system, or the like. Presentation devices 120 employ a display, one or more speakers, and/or other output devices to communicate video and/or audio content to a user. In many implementations, one or more presentation devices 120 reside in or near a customer's premises 116 and are communicatively coupled, directly or indirectly, to the receiving device 118. Further, the receiving device 118 and the presentation device 120 may be integrated into a single device. Such a single device may have the above-described functionality of the receiving device 118 and the presentation device 120, or may even have additional functionality. Also, a user frustration monitoring and control system such as user frustration monitoring and control system 100 may also or instead be a part of, integrated with or otherwise operably coupled to various other electronic devices, such as presentation device 120 and/or remote 128 and, in various embodiments, may each operate independently or in conjunction with user frustration monitoring and control system 100 of the receiving device 118.

A content provider 104 provides program content, such as television content, to a distributor, such as the program distributor 106. Example content providers include television stations which provide local or national television programming, special content providers which provide premium based programming or pay-per-view programming.

Program content, which may also be referred to as a program, is communicated to the program distributor 106 from the content provider 104 through suitable communication media, generally illustrated as communication system 108 for convenience. Communication system 108 may include many different types of communication media, now known or later developed. Non-limiting media examples include telephone systems, the Internet, internets, intranets, cable systems, fiber optic systems, microwave systems, asynchronous transfer mode ("ATM") systems, frame relay systems, digital subscriber line ("DSL") systems, radio frequency ("RF") systems, and satellite systems.

In at least one embodiment, the received program content is converted by the program distributor 106 into a suitable signal (a "program signal") that is communicated (i.e., "uplinked") by one or more antennae 110 to one or more satellites 112 (separately illustrated herein from, although considered part of, the communication system 108). The communicated uplink signal may contain a plurality of multiplexed programs. The uplink signal is received by the satellite 112 and then communicated (i.e., "downlinked") from the satellite 112 in one or more directions, for example, onto a predefined portion of the planet.

A receiver antenna 114 that is within reception range of the downlink signal communicated from satellite 112 receives the above-described downlink signal. The receiver antenna 114 can be located at customer premises 116. Examples of customer premises 116 include a residence, a business, or any other suitable location operable to receive signals from satellite 112. The received signal is communicated, typically over a hard-wire connection, to the receiving device 118. The receiving device 118 converts the received signal from antenna 114 into a signal and/or format suitable for communication to a presentation device 120 or another device, such as another digital video recorder or a home computing system. In some embodiments, the receiver antenna 114 may be remotely located from the customer premises 116. For example, the antenna 114 may be located on the roof of an apartment building, such that the received signals may be transmitted, after possible recoding, via cable or other mechanisms, such as Wi-Fi, to the customer premises 116.

The receiving device 118 may receive programming partially, or entirely, from a source other than the above-described receiver antenna 114. Other embodiments of the receiving device 118 may receive programming from program distributors 106 and/or content providers 104 via locally broadcast RF signals, cable, fiber optic, Internet media, or the like.

In addition, information provider 138 may provide various forms of content and/or services to various devices residing in the customer premises 116. For example, information provider 138 may provide a Web page (or other information) to the receiving device 118 or other computing device. Information provider 138 may further perform or facilitate electronic commerce transactions. Information provider 138 may also provide information regarding testing or configuration of the receiving device 118 that may be performed in response to detected user frustration with electronic devices on the customer premises 116 and/or other locations in addition to, or instead of, such information being provided by the remote monitoring system 122.

In the illustrated example, the user frustration monitoring and control system 100 may monitor the receiving device 118 as it receives and processes the received program content. In some embodiments, this is in response to detected user frustration with electronic devices on the customer premises 116, such as that detected by receiving device 118. The user frustration monitoring and control system 100 may also control the receiving device 118 by causing the receiving device 118 to switch between, tune to and/or display particular received program content. The user frustration monitoring and control system 100 may also control the receiving device 118 by causing the receiving device 118 to perform particular e-commerce transactions or perform other interactive operations, such as, for example, any commands that could be entered by a user via a remote control device or other interface. The user frustration monitoring and control system 100 is configured to communicate testing and monitoring results of the receiving device 118 and/or other electronic devices, such as remote 128 and presentation device 120, over the communication system 108 to remote entities, such as, for example, remote monitoring system 122, information provider 138, content provider 104 and/or program distributor 106 for further action, processing or reporting. For example, this further action, processing or reporting, may include changing/reasserting the presentation device/chain input or channel, notification to the user that includes one or more of: data representing troubleshooting options for the user regarding the electronic device; help menu options for the user regarding the electronic device; contact information for technical support regarding the electronic device; directions regarding technical support for the electronic device; a link to data regarding technical support for the electronic device; results of the diagnostic action taken in response to detected user frustration and instructions to the user on how to take a corrective action based on the diagnostic action taken in response to the detected user frustration.

The above description of the content distribution environment 102, the customer premises 116, and the various devices therein, is intended as a broad, non-limiting overview of an example environment in which various embodiments of systems and methods for detecting and responding to user frustration with electronic devices may be implemented. FIG. 1 illustrates just one example of a content distribution environment 102 and the various embodiments discussed herein are not limited to such environments. In particular, content distribution environment 102 and the various devices therein, may contain other devices, systems and/or media not specifically described herein. For example, in some embodiments, the user frustration monitoring and control system 100 may be embedded or otherwise located in a component of a vehicle, such as in a steering wheel or dashboard to detect user frustration of a driver or passenger. In some such embodiments, the presentation device 120 may be that of a vehicle navigation system or other vehicle audio-visual system.

Example embodiments described herein provide applications, tools, data structures and other support to implement systems and methods for detecting and responding to user frustration with electronic devices. The example of the electronic device having a user frustration monitoring and control system 100 shown in FIG. 1 is receiving device 118. However, other embodiments of the described techniques may include other devices having a user frustration monitoring and control system such that user frustration with other devices may be detected, including other receiving devices, such as audio and DVD players, digital recorders, computers, peripherals, input devices, keyboards, televisions, mobile devices, telephones, and other electronic devices. In the following description, numerous specific details are set forth, such as data formats, code sequences, and the like, in order to provide a thorough understanding of the described techniques. The embodiments described also can be practiced without some of the specific details described herein, or with other specific details, such as changes with respect to the ordering of the code flow, different code flows, and the like. Thus, the scope of the techniques and/or functions described are not limited by the particular order, selection, or decomposition of steps described with reference to any particular module, component, or routine.

Figure 2:
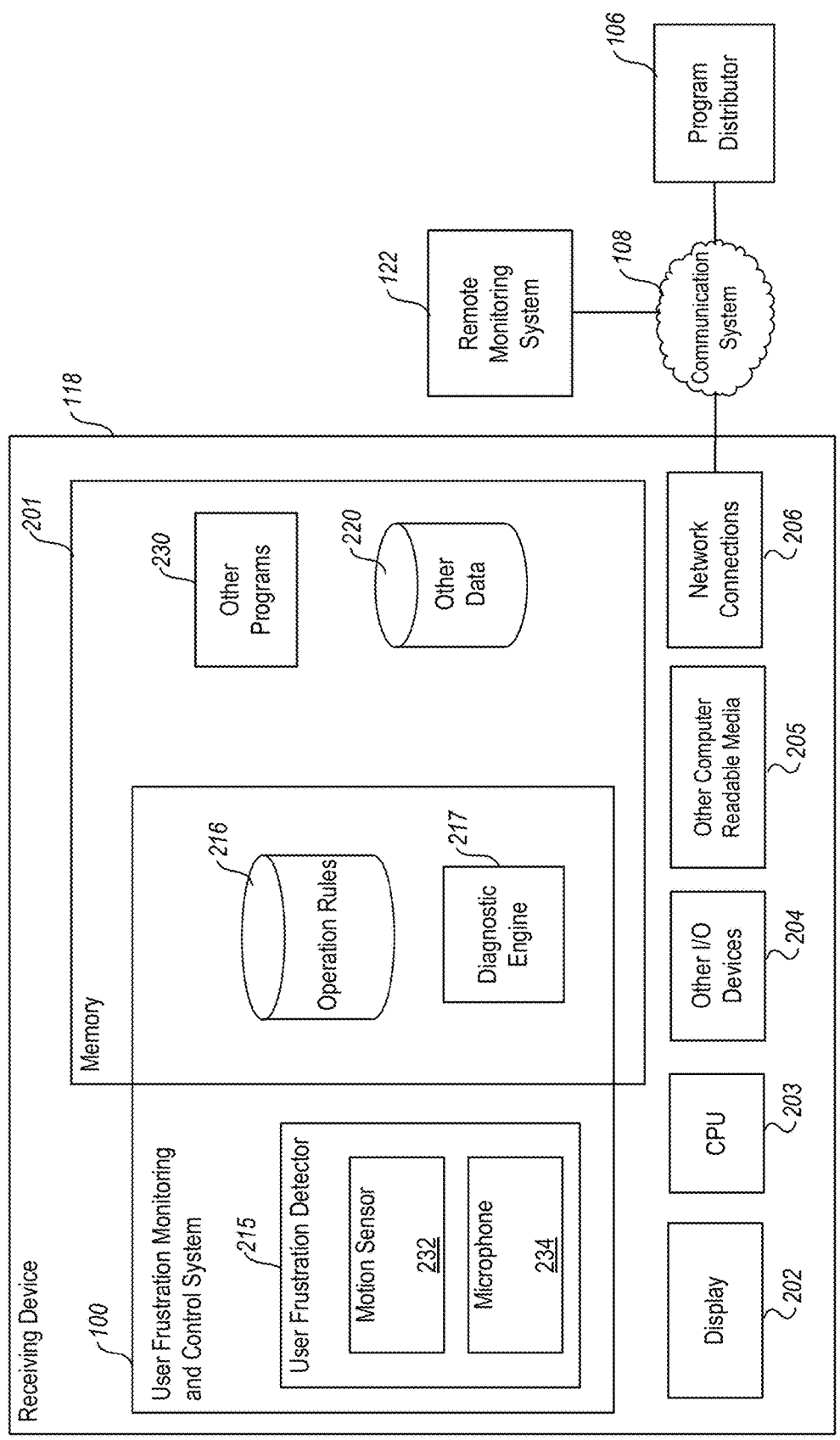
FIG. 2 is a block diagram illustrating elements of an example receiving device having a system for detecting and responding to user frustration with electronic devices according to one embodiment.

FIG. 2 is a block diagram illustrating elements of an example receiving device 118 having a system for detecting and responding to user frustration with electronic devices according to one embodiment.

In one embodiment, the receiving device 118 is a set-top box configured to receive, record and display programming on a presentation device, such as presentation device 120 shown in FIG. 1. In other embodiments, the receiving device 118 is part of a presentation device, such as a television or is a digital video recorder (DVR) device. Note that one or more general purpose or special purpose computing systems/devices may be used to operate and store information regarding the receiving device 118, and communicate with communication system 108. In addition, the receiving device 118 may comprise one or more distinct computing systems/devices and may span distributed locations. Furthermore, each block shown may represent one or more such blocks as appropriate to a specific embodiment or may be combined with other blocks. Also, the user frustration monitoring and control system 100 of the receiving device 118 may be implemented in software, hardware, firmware, or in some combination to achieve the capabilities described herein.

In the embodiment shown, receiving device 118 comprises a computer memory ("memory") 201, a display 202, one or more Central Processing Units ("CPU") 203, Input/Output devices 204 (e.g., keyboard, mouse, RF or infrared receiver, light emitting diode (LED) panel, cathode ray tube (CRT) or liquid crystal display (LCD), USB ports, other communication ports, and the like), other computer-readable media 205, and network connections 206. Operation rules 216 and diagnostic engine 217 portions of the user frustration monitoring and control system 100 are shown residing in memory 201. In other embodiments, some portion of the contents, and some, or all, of the components of operation rules 216 and diagnostic engine 217 may be stored on and/or transmitted over the other computer-readable media 205. The operation rules 216 and diagnostic engine 217 components of the user frustration monitoring and control system 100 preferably execute on one or more CPUs 203 and facilitate the detection of and response to user frustration as described herein. The user frustration monitoring and control system 100 also facilitates communication with peripheral devices, such as remote 128 and remote systems, such as remote monitoring system 122 and program distributor 106, via the I/O devices 204 and network connections 206. For example, the user frustration monitoring and control system 200 may also interact via the communication system 108 with other devices and systems such as the program distributor 106, remote monitoring system 122, or the like. For example, the other device may be a home computing system (e.g., a desktop computer, a laptop computer, etc.) or mobile device that includes the functionality of the operation rules 216 and diagnostic engine 217 components of the user frustration monitoring and control system 100.

A user frustration detector 215 detects the user hitting or jarring the receiving device 118 in a manner that is indicative of user frustration. For example, the user frustration detector 215 may include a motion sensor 232 that is affixed to the receiving device and senses the physical movement of the receiving device 118 as a result of the user hitting or jarring the receiving device 118. In some embodiments, the motion sensor 232 may include an accelerometer which is an electromechanical device that measures acceleration forces. These forces may be static, like the constant force of gravity or they could be dynamic caused by movement of the receiving device and, thus, movement of the accelerometer. When the receiving device 118 is jarred or hit by a user, the accelerometer outputs signals including information representing an amount of dynamic acceleration resulting from the movement of the receiving device 118 to which the accelerometer is affixed. The accelerometer may operate using a piezoelectric effect. In particular, the accelerometer may contain microscopic crystal structures that are stressed by accelerative forces, which causes a voltage to be generated. In other embodiments, the accelerometer may also, or instead, detect motion of the receiving device 118 to which the accelerometer is affixed by sensing changes in capacitance. In particular, the accelerometer may have two microstructures located next to each other which have a certain capacitance between them. If an accelerative force moves one of the structures, such as caused by a user jarring or hitting the receiving device 118, then the capacitance will change. In this particular embodiment, the accelerometer includes applicable circuitry to convert from capacitance to voltage. In various other embodiments, the accelerometer may utilize one or more other methods to detect movement of the receiving device 118 to which the accelerometer is affixed, including use of a piezoresistive effect, hot air bubbles, and light. In some embodiments, the accelerometer may be small micro electro-mechanical system (MEMS), and includes a cantilever beam with a proof mass (also known as seismic mass). Under the influence of external accelerations the proof mass deflects from its neutral position. This deflection is measured in an analog or digital manner. In particular, the capacitance between a set of fixed beams and a set of beams attached to the proof mass is measured.

In some embodiments, a three axis accelerometer may be included in the user frustration detector 215 for the user frustration monitoring and control system 100 to distinguish between sideways forces, which typically result from a user jarring the electronic device out of frustration, and vertical forces, which may instead result from accidental dropping of the electronic device. In other embodiments, multiple accelerometers may be used for this and other purposes. For example, two two-axes accelerometers mounted at right angles may be included in the user frustration detector 215 affixed to the receiving device 118. Preferably, one or more accelerometers with a maximum swing of at least ±5 g and bandwidth of several hundred Hz are used.

In some embodiments, the electronic signal from the accelerometer that is indicative of the receiving device 118 being jarred by a user is a continuous voltage that is proportional to acceleration of the accelerometer affixed to the receiving device 118. In other embodiments, the electronic signal from the accelerometer may be a digital or pulse width modulation signal that includes a square wave of a particular frequency. An amount of time the voltage of the pulse width modulation signal is high is proportional to an amount of acceleration of the accelerometer affixed to the receiving device 118. In some embodiments, the electronic signal from the accelerometer may be a digitally encoded signal such as that used by the Inter-Integrated Circuit serial computer bus ($I^2C$) or the Serial Peripheral Interface (SPI) bus. Various suitable accelerometers are available from NXP Semiconductors, including the NXP® FXLN83xxQ line of accelerometers and the NXP® FXLS8471Q accelerometer, and provide relatively fast response times, low current consumption, low voltage operation, and a standby mode in a small profile package to detect orientation, shake, tap, double tap, fall, tilt, motion, positioning, shock or vibration. In other embodiments, the user frustration detector 215 may also, or instead, include other types of motion detector devices. For example, the user frustration detector 215 may include a mechanical switch having two metal strips that make contact with each other when the electronic device to which it is affixed is jarred or hit by a user.

The user frustration monitoring and control system 100 receives, processes, and interprets the signals received from the user frustration detector 215, for example, from a motion sensor 232 as described above included in the user frustration detector 215. For example, the operation rules 216 of the user frustration monitoring and control system 100 may cause the user frustration monitoring and control system 100 to obtain a measurement of an amount of dynamic acceleration of the receiving device 118 based on the signal received from the motion sensor 232 of the user frustration detector 215 affixed to the receiving device 118. In various embodiments, the motion sensor 232 of the user frustration detector 215 may be affixed to an interior or exterior housing of the receiving device 118, or to an internal component of the receiving device. The operation rules 216 of the user frustration monitoring and control system 100 may cause the user frustration monitoring and control system 100 to determine whether the signal received from the motion sensor 232 that is indicative of the receiving device 118 being jarred by a user is indicative of user frustration based on the obtained measurement of the amount of dynamic acceleration of the receiving device 118. For example, operation rules 216 of the user frustration monitoring and control system 100 may cause the user frustration monitoring and control system 100 to compare the measurement of the amount of dynamic acceleration to a threshold amount of dynamic acceleration and determine whether the measurement of the amount of dynamic acceleration exceeds the threshold amount of dynamic acceleration. This threshold amount of dynamic acceleration may vary, but is based on characteristics of an acceleration that would typically result from a user jarring or hitting the receiving device 118 out of frustration. A relatively slow measured acceleration, or change of orientation may result from typical movement of the electronic device by the user, such as when moving it to another location. In one example, if the signal received from the user frustration detector 215 indicates the amount of dynamic acceleration is greater than about 10 $m/s^2$ in a lateral direction, then this may indicate that the receiving device to which the user frustration detector 215 is affixed has been hit or jarred by the user out of frustration rather than a typical movement. Various other threshold amounts may be used in various other embodiments. Thus, in response to a determination by the user frustration monitoring and control system 100 that the measurement of the amount of dynamic acceleration exceeds the threshold amount of dynamic acceleration, the operation rules 216 cause the user frustration monitoring and control system 100 to determine that the electronic signal received from the motion sensor 232 is indicative of user frustration. On the other hand, in response to a determination by the user frustration monitoring and control system 100 that the measurement of the amount of dynamic acceleration does not exceed the threshold amount of dynamic acceleration, the operation rules 216 cause the user frustration monitoring and control system 100 to determine that the electronic signal received from the motion sensor 232 is not indicative of user frustration.

In some embodiments, user frustration monitoring and control system 100 may also obtain a measurement of a direction of dynamic acceleration of the receiving device 118 based on the signal received from the motion sensor 232 of the user frustration detector 215 affixed to the receiving device 118. In this case, the determination of whether the signal received from the motion sensor 232 of the user frustration detector 215 is indicative of user frustration is also based on the obtained measurement of the direction of dynamic acceleration of the electronic device. The accelerometer may produce a direction vector for this measurement. In some embodiments, a gyroscope is used to supplement the accelerometer to distinguish turning the device versus a smack or hit that does not physically reorient the device. In some embodiments, a magnetic compass is also or instead used for this purpose. For example, a three axis accelerometer may be included in the user frustration detector 215 for the user frustration monitoring and control system 100 to distinguish between sideways forces, which typically result from a user jarring the electronic device out of frustration, and vertical forces, which may instead result from the user picking up the electronic device to move it or from accidental dropping of the electronic device. In one embodiment, the threshold used for determining whether the signal received from the motion sensor 232 of the user frustration detector 215 is indicative of user frustration may be different for sideways or lateral forces than for vertical forces (which may also taking into account the vertical force of the earth's gravity). For example, vertical accelerations in the upward direction may be ignored in some embodiments or have a higher threshold before being considered to be the result of the user jarring or hitting of the electronic device out of frustration.

In some embodiments, user frustration monitoring and control system 100 may also obtain a measurement of a length of time of a period of dynamic acceleration of the receiving device 118 based on the signal received from the motion sensor 232 of the user frustration detector 215 affixed to the receiving device 118. In this case, the determination of whether the signal received from the motion sensor 232 of the user frustration detector 215 is indicative of user frustration is also based on the obtained measurement of the length of time of the period of dynamic acceleration of the receiving device 118. For example, a relatively short period of acceleration may typically result from the user jarring or hitting the receiving device 118 out of frustration while a longer period of acceleration may be the result of the user moving the device normally or carrying the device to another location. In one example, if the signal received from the user frustration detector 215 indicates the length of time of the period of dynamic acceleration of the receiving device 118 is less than 0.1 second, then this may indicate that the receiving device 118 to which the user frustration detector 215 is affixed had been hit or jarred by the user out of frustration rather than a typical movement, and the user frustration monitoring and control system 100 will act accordingly.

Various other threshold amounts for the length of time of the period of dynamic acceleration may be used in various other embodiments and may be used in combination with other factors and threshold amounts. For example, as the length of time of the period of dynamic acceleration gets shorter, the threshold for the amount of dynamic acceleration may lower. This is because a very short period of acceleration would more likely be the result of the user hitting or jarring the electronic device, even if the force with which the user hit or jarred the device is not very high. This may be the case when the user taps the top of the receiving device 118, resulting in an extremely short period of acceleration due to further movement of the receiving device 118 being prevented by the shelf or table on which it rests.

The determination made by the user frustration monitoring and control system 100 of whether the signal received from the motion sensor 232 is indicative of user frustration may also be based whether the receiving device 118 is currently in a mode to accept user input. This is due to the fact that a user will not normally be interacting with the receiving device 118 when it is not in a mode to accept user input, such as when it is in standby mode or other mode restricting user input and, thus, movement of the receiving device 118 at that point would most likely not be the result of user frustration. Thus, in one embodiment, if a determination was made by the user frustration monitoring and control system 100 that the receiving device 118 is not in a mode to accept user input, the operation rules 216 of the user frustration monitoring and control system 100 determines that the signal received from the motion sensor 232 of the user frustration detector 215 is not indicative of user frustration.

The determination made by the user frustration monitoring and control system 100 of whether the signal received from the motion sensor 232 is indicative of user frustration may also be based on whether the receiving device 118 is outputting a graphical user interface (GUI). This is due to the fact that there is a higher probability that a user will be interacting with the receiving device 118 when it is outputting a GUI, such as an electronic program guide (EPG) or system configuration menu and, thus, movement of the receiving device 118 at that point would have a higher probability of being the result of user frustration. Thus, in one embodiment, electronically monitoring by the user frustration monitoring and control system 100 of one or more motion sensors occurs in response to the receiving device 118 outputting a graphical user interface. In various embodiments, if a determination was made by the user frustration monitoring and control system 100 that the receiving device 118 is outputting a GUI, the operation rules 216 of the user frustration monitoring and control system 100 cause the user frustration monitoring and control system to determine that the signal received from the motion sensor 232 of the user frustration detector 215 is indicative of user frustration, either regardless of, or also based on, whether the measurement of accelerative force according to the signal received from the motion sensor 232 exceeds a threshold. In some embodiments, this threshold may be based on whether the receiving device 118 is currently outputting a graphical user interface (GUI).

The determination made by the user frustration monitoring and control system 100 of whether the signal received from the motion sensor 232 is indicative of user frustration may also be based on whether the receiving device 118 is currently outputting an audio or video signal to the presentation device 120. This is due to the fact that there is a higher probability that a user will be interacting with, or experiencing trouble with, the receiving device 118 while it is outputting an audio or video signal to the presentation device 120, such as an electronic program guide (EPG) or system configuration menu and, thus, movement of the receiving device 118 at that point would have a higher probability of being the result of user frustration. Thus, in one embodiment, electronic monitoring by the user frustration monitoring and control system 100 of one or more motion sensors occurs in response to the receiving device 118 outputting an audio or video signal to the presentation device 120. In various embodiments, if a determination was made by the user frustration monitoring and control system 100 that the receiving device 118 is outputting an audio or video signal to the presentation device 120, the operation rules 216 of the user frustration monitoring and control system 100 cause the user frustration monitoring and control system to determine that the signal received from the motion sensor 232 of the user frustration detector 215 is indicative of user frustration, either regardless of, or also based on, whether the measurement of accelerative force according to the signal received from the motion sensor 232 exceeds a threshold. In some embodiments, this threshold may be based on whether the receiving device 118 is currently outputting an audio or video signal to the presentation device 120.

In response to the determination of the user frustration monitoring and control system 100 that the signal received from the motion sensor 232 of the user frustration detector 215 is indicative of user frustration, the operation rules 216 of the user frustration monitoring and control system 100 cause the user frustration monitoring and control system 100 perform an electronic action to address the user frustration. In various embodiments, this electronic action includes a diagnostic action or causes a diagnostic action to be selected, initiated and/or performed by the diagnostic engine 217, for example. The diagnostic action may include local actions being performed by or on the receiving device 118 or other devices in communication with the receiving device, such as remote 128 and presentation device 120. The diagnostic action may also, or instead, include other actions involving communications with the remote monitoring system 122, information provider 138, content provider 104 and/or program distributor 106 for further action, processing or reporting. In particular, in various embodiments, the diagnostic action may include one or more of: placing an automated service call to a manufacturer or service provider for the electronic device; contacting a remote server of a manufacturer or service provider for the electronic device; sending diagnostic data to a remote server of a manufacturer or service provider for the electronic device; monitoring audio or video signals input to or output from the electronic device; performing one or more tests regarding audio or video signals input to or output from the electronic device; checking configuration of the electronic device; testing operations of the electronic device; detecting a failure or fail condition of the electronic device; capturing video, audio, electronic, infrared (IR) or radio frequency (RF) information input to or output from the electronic device; varying AC voltages to the electronic device; detecting loss or fade of signal input to or output from the electronic device; electronically checking data regarding current weather or natural disaster issues that may affect signal quality or performance of the electronic device; communicating with a remote monitoring system 122 to determine existence of a systemic problem related to a plurality of electronic devices within a particular geographical region; and determining current operating states, conditions, messages or functionalities of the electronic device.

In some embodiments, in response to the determination of the user frustration monitoring and control system 100 that the signal received from the motion sensor 232 of the user frustration detector 215 is indicative of user frustration, the operation rules 216 of the user frustration monitoring and control system 100 cause the user frustration monitoring and control system 100 to perform a corrective action based on the diagnostic action taken in response to the determination by the user frustration monitoring and control system 100 that the signal received from the motion sensor 232 of the user frustration detector 215 is indicative of user frustration. This correction action may be to change a setting or configuration of the receiving device or other applicable device in the content distribution environment 102 shown in FIG. 1. For example, the user may have shown frustration that the video or audio output on the presentation device 120 has disappeared or become distorted. The corrective action determined by the user frustration monitoring and control system 100 as a result of the diagnostic action taken by the user frustration monitoring and control system 100 may then be to cause an adjustment of a position of the receiver antenna 114 or to cause the receiving device 118 to tune to another channel that has the same or equivalent program. As another example, the user may have shown frustration that the television or presentation device input is set to the wrong source, for example, cable channel 20 instead of HDMI Source 1. The corrective action determined by the user frustration monitoring and control system 100 as a result of the diagnostic action taken by the user frustration monitoring and control system 100 may then be to switch to another source, which may be the previous source setting or another source setting that is typically used. As an additional example, the user may have shown frustration that a resolution setting is unsupported or incorrect. The corrective action determined by the user frustration monitoring and control system 100 as a result of the diagnostic action taken by the user frustration monitoring and control system 100 may then be to switch to another resolution setting, which may be the previous resolution setting or another resolution setting that is typically used or supported. The user frustration monitoring and control system 100 may also cause the receiving device 118 to provide a list of options to the user to take such corrective actions. These options may be presented on the display 202 of the receiving device, on the presentation device 120 or on a mobile device of the user.

In some embodiments, in response to the determination of the user frustration monitoring and control system 100 that the signal received from the motion sensor 232 of the user frustration detector 215 is indicative of user frustration, the operation rules 216 of the user frustration monitoring and control system 100 cause the user frustration monitoring and control system 100 to electronically provide a notification to the user. In some embodiments, this notification may be based on the diagnostic action taken by the user frustration monitoring and control system 100 in response to the determination by the user frustration monitoring and control system 100 that the signal received from the motion sensor 232 of the user frustration detector 215 is indicative of user frustration. In various embodiments, the notification to the user includes one or more of: data representing troubleshooting options for the user regarding the electronic device; help menu options for the user regarding the electronic device; contact information for technical support regarding the electronic device; directions regarding technical support for the electronic device; a link to data regarding technical support for the electronic device; results of the diagnostic action taken in response to the determination that the signal received from the motion sensor 232 of the user frustration detector 215 is indicative of user frustration; and instructions to the user on how to take a corrective action based on the diagnostic action taken in response to the determination made by the user frustration monitoring and control system 100 that the signal received from the motion sensor 232 of the user frustration detector 215 is indicative of user frustration.

In some embodiments, the user frustration detector 215 may additionally, or instead of the motion sensor 232, include a microphone 234. Signals from the microphone 234 may also be used by the user frustration monitoring and control system 100 alone or in conjunction with signals from the motion sensor 232 of the user frustration detector 215 to detect user frustration with the receiving device 118 or other electronic devices in communication with the receiving device, such as remote 128 and/or presentation device 120. These signals may be signals representing sound resulting from the user jarring or hitting the receiving device 118 and/or from user utterances. The microphone 234 may be operably coupled to the memory 201 and to the CPU 203. In some embodiments, the user frustration monitoring and control system 100 receives an electronic signal from the microphone 234 that is indicative of the electronic device being physically hit by a user. The operation rules 216 of the user frustration monitoring and control system 100 cause the user frustration monitoring and control system to determine whether the electronic signal from the microphone 234 includes audio characteristics of a sound indicative of the receiving device 118 being physically hit by the user. In some embodiments, the determination by the user frustration monitoring and control system 100 of whether the signal received from the motion sensor 232 is indicative of user frustration is based on the signal received from the motion sensor 232 and a determination that the electronic signal from the microphone 234 includes audio characteristics of a sound indicative of the electronic device being physically hit by the user. Such a determination may be based on whether the signal received from the microphone 234 is received at the same time or coincides with the time at which the acceleration occurred as detected by the motion sensor 232.

For example, determination of whether the signal received from the motion sensor 232 is indicative of user frustration may also be based on a measured level of the audio signal received from the microphone 234 at a same time the signal from the motion sensor 232 is received. In particular, if the signal received from the microphone 234 is received at the same time or coincides with the time at which the acceleration occurred as detected by the motion sensor 232, this may indicate the detected sound resulted from the user hitting or jarring the receiving device out of frustration. Also, various stored profiles of audio signals corresponding to those characteristic of the receiving device 118 being hit or jarred by the hand of a user may be compared to the received audio signals from the microphone 234 for the user frustration monitoring and control system 100 to determine whether the received audio signals from the microphone 234 are a result of the user jarring or hitting the receiving device out of frustration. The user frustration monitoring and control system 100 may then take the appropriate diagnostic or corrective action, or provide a helpful communication to the user.

In other example embodiments, the motion sensor 232, microphone 234 and/or other components of the user frustration monitoring and control system 100 may be located in other devices in communication with the receiving device 118, such as in remote 128 and presentation device 120. In one such embodiment, the signal from the motion sensor 232 and/or microphone 234 associated with occurrence of user frustration is communicated from the remote 128 or presentation device 120 to the receiving device to cause the receiving device to take an action to address the user frustration. In this manner, when the user jars or hits the remote 128 or presentation device 120, the user frustration monitoring and control system 100 of either the remote 128 or presentation device 120, if present in the remote 128 or presentation device 120, or the user frustration monitoring and control system 100 of the receiving device 118 will make a determination whether the signal is indicative of user frustration as described herein. The receiving device may then take the applicable action as described herein to address the user frustration. This may include, for example, presenting information on the presentation device 120 to the user and/or running diagnostic tests on the remote 128 or presentation device 120. These diagnostic tests and actions to address the user frustration may be performed and/or triggered by the receiving device 118, the remote 128 or presentation device 120. For example, the remote 128 may have a display on which helpful information may be presented to the user in response to the remote 128 or receiving device 118 detecting user frustration via a signal received from a motion sensor and/or microphone in the remote 128.

Other code or programs 230 (e.g., an audio/video processing module, a program guide manager module, a Web server, and the like), and potentially other data repositories, such as other data repository 220, also reside in the memory 201, and preferably execute on one or more CPUs 203. Of note, one or more of the components in FIG. 2 may not be present in any specific implementation. For example, some embodiments may not provide other computer readable media 205 or a display 202.

In some embodiments, the user frustration monitoring and control system 100 includes an application program interface ("API") that provides programmatic access to one or more functions of the user frustration monitoring and control system 100. Such an API may provide a programmatic interface to one or more functions of the user frustration monitoring and control system 100 that may be invoked by one of the other programs 230 or some other module. In this manner, the API enables software, such as user interfaces, plug-ins and adapters to integrate functions of the user frustration monitoring and control system 100 into desktop computer or mobile device applications, and the like.

In some embodiments, the user frustration monitoring and control system 100 detects the user jarring or hitting the receiving device 118 and determines this is a result of user frustration. The user frustration monitoring and control system 100 then communicates via network connections 206 a command or message to an application running on a mobile device associated with the user and utilizing the API. For example, the message may be a message regarding a diagnostic action performed by the user frustration monitoring and control system 100, a command to perform a diagnostic action, information to be relayed to a remote monitoring system 122, and/or may include a helpful message or instructions to the user. In addition, the API may be, in at least some embodiments, invoked or otherwise accessed via the user frustration monitoring and control system 100, or remote entities, such as the program distributor 106 and the remote monitoring system 122, to access various functions of the user frustration monitoring and control system 100. For example, the program distributor 106 and the remote monitoring system 122 may select particular diagnostic tests or routines to be performed on the receiving device 118, select particular video or audio signals to be output at the various I/O devices 204, perform particular configurations of the receiving device 118, or perform various recording and playback operations by the receiving device 118 via the API.

In an example embodiment, components/modules of the user frustration monitoring and control system 100 are implemented using standard programming techniques. For example, the operation rules 216 and diagnostic engine 217 portions of the user frustration monitoring and control system 100 may be implemented as a "native" executable running on the CPU 203, along with one or more static or dynamic libraries. In other embodiments, the operation rules 216 and diagnostic engine 217 portions of the user frustration monitoring and control system 100 may be implemented as instructions processed by a virtual machine that executes as one of the other programs 230. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), or declarative (e.g., SQL, Prolog, and the like).

In a software or firmware implementation, instructions stored in a memory configure, when executed, one or more processors of the receiving device 118 to perform the functions of the user frustration monitoring and control system 100 described herein. In one embodiment, instructions cause the CPU 203 or some other processor, such as an I/O controller/processor, to select and present various programming. Similarly, the CPU 203 or other processor may be configured to perform other operations such as playing a recording in various playback modes.

The embodiments described above may also use well-known or other synchronous or asynchronous client-server computing techniques. However, the various components may be implemented using more monolithic programming techniques as well, for example, as an executable running on a single CPU computer system, or alternatively decomposed using a variety of structuring techniques known in the art, including but not limited to, multiprogramming, multi-threading, client-server, or peer-to-peer, running on one or more computer systems each having one or more CPUs. Some embodiments may execute concurrently and asynchronously, and communicate using message passing techniques. Equivalent synchronous embodiments are also supported by a receiving device user frustration monitoring and control system 100 implementation. Also, other functions could be implemented and/or performed by each component/module, and in different orders, and by different components/modules, yet still achieve the functions of the user frustration monitoring and control system 100.

In addition, programming interfaces to the data stored as part of the user frustration monitoring and control system 100, can be available by standard mechanisms such as through C, C++, C#, and Java APIs; libraries for accessing files, databases, or other data repositories; scripting languages such as XML; or Web servers, FTP servers, or other types of servers providing access to stored data. The operations rules 216 and other data repository 220 may be implemented as one or more database systems, file systems, or any other technique for storing such information, or any combination of the above, including implementations using distributed computing techniques.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, and Web Services (XML-RPC, JAX-RPC, SOAP, and the like). Other variations are possible. Other functionality could also be provided by each component/module, or existing functionality could be distributed amongst the components/modules in different ways, yet still achieve the functions of the user frustration monitoring and control system 100.

Furthermore, in some embodiments, some or all of the components of the user frustration monitoring and control system 100 may be implemented or provided in other manners, such as at least partially in firmware and/or hardware, including, but not limited to one or more application-specific integrated circuits ("ASICs"), standard integrated circuits, controllers (e.g., by executing appropriate instructions and including microcontrollers and/or embedded controllers), field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network, cellular wireless network or other data transmission medium; or a non-transitory computer-readable storage medium to be read by an appropriate drive or via an appropriate connection, such as a DVD, random access memory (RAM) or flash memory device) so as to enable or configure the computer-readable medium and/or one or more associated computing systems or devices to execute or otherwise use or provide the contents to perform at least some of the described techniques. A transitory computer-readable medium as used herein means a signal transmission itself (for example, a propagating electrical or electromagnetic signal itself) and not the hardware medium on which information is stored. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

Figure 3:
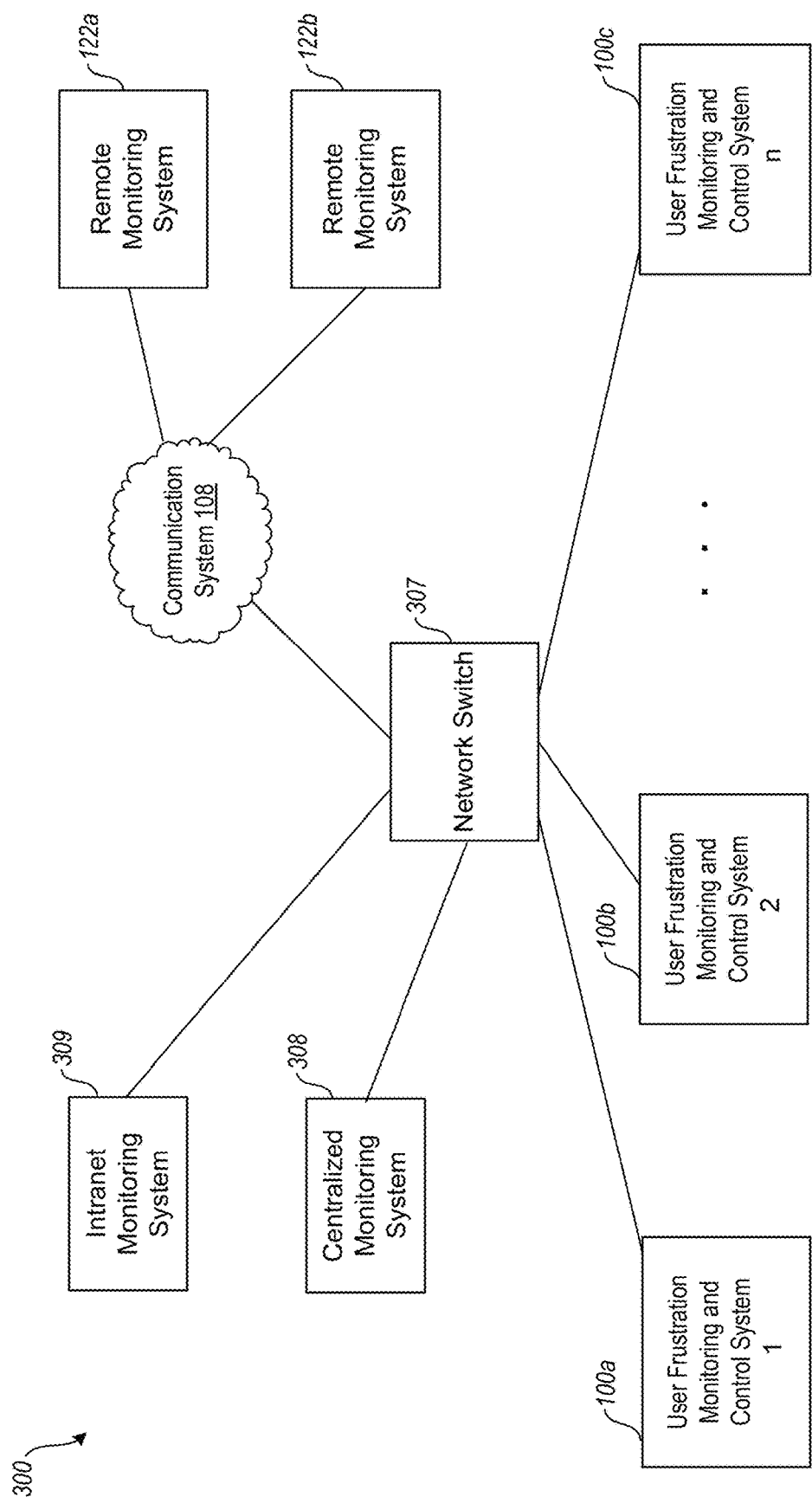
FIG. 3 is a block diagram of a system for detecting and responding to user frustration with electronic devices, including user frustration monitoring and control systems of multiple electronic devices according to one example embodiment.
Figure 5:
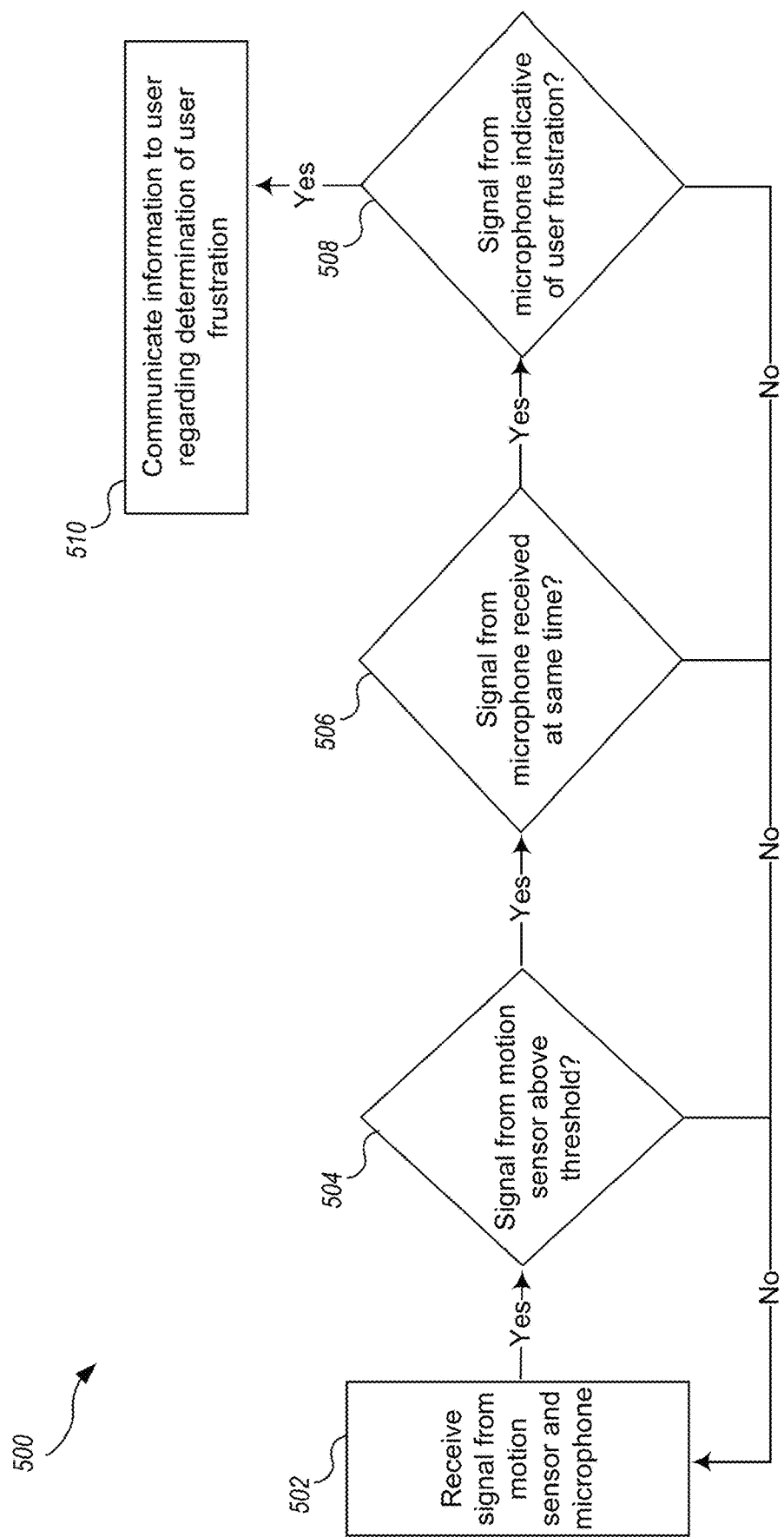
FIG. 5 is a flow diagram of an example method for detecting and responding to user frustration with electronic devices according to a second example embodiment.

FIG. 3 a block diagram of a system 300 for detecting and responding to user frustration with electronic devices, including user frustration monitoring and control systems of multiple electronic devices according to one example embodiment. Shown in FIG. 5 are a plurality of user frustration monitoring and control systems (user frustration monitoring and control system 1 100*a*, user frustration monitoring and control system 2 100*b*, . . . , user frustration monitoring and control system n 100*c*). Each user frustration monitoring and control system is affixed to a corresponding device, such a receiving device 118, which is shown in FIGS. 1 and 2, but is not shown in FIG. 3 so as to provide a clearer illustration. In this way, each user frustration monitoring and control system (user frustration monitoring and control system 1 100*a*, user frustration monitoring and control system 2 100*b*, . . . , user frustration monitoring and control system n 100*c*) may communicate with a centralized monitoring system 308, an intranet monitoring system 309 and/or one or more remote monitoring systems 122*a*, 122*b*, for example. This communication may be to determine existence of a systemic problem related to a plurality of electronic devices within a particular customer premises, service area, city or geographical region. For example, in a scenario where the user frustration monitoring and control systems are all located on one user premises, such as user premises 116 shown in FIG. 1, each user frustration monitoring and control system may be in communication with a local network switch, hub, or router 307 over the user's wireless and/or wired local area network (LAN) which is in turn in communication with the centralized monitoring system 308 and intranet monitoring system 309 for that user's LAN. The data associated with user frustration detected by the user frustration monitoring and control systems (user frustration monitoring and control system 1 100*a*, user frustration monitoring and control system 2 100*b*, . . . , user frustration monitoring and control system n 100*c*) of the devices on the user's LAN on the customer premises 116 may then be communicated as associated with that particular user or that particular user's LAN over communication system 108 to various remote monitoring systems, such as remote monitoring systems 122*a*, 122*b*, in order for those remote monitoring systems 122*a*, 122*b* to compare such data with other customers to recognize and determine existence of a systemic problem related to a plurality of electronic devices within a particular customer premises, service area, city or geographical region.

Each device corresponding to each user frustration monitoring and control system within the system 300 need not be the same type of device, or be a same model or have the same tests run or monitoring scenario run at the same time because each user frustration monitoring and control system may operate independently using particular configurations and parameters according to the individual corresponding device to which it is affixed.

Each user frustration monitoring and control system (user frustration monitoring and control system 1 100*a*, user frustration monitoring and control system 2 100*b*, . . . , user frustration monitoring and control system n 100*c*) is operably connected to the network switch 307 (e.g., via the corresponding network interface of each user frustration monitoring and control system). A centralized monitoring system 308 (e.g., including a network-enabled computing system) is also connected to the network switch 307. The centralized monitoring system 308 may receive raw diagnostic or test result data from each user frustration monitoring and control system (user frustration monitoring and control system 1 100*a*, user frustration monitoring and control system 2 100*b*, . . . , user frustration monitoring and control system n 100*c*) and provides further analysis of the received test result data. The centralized monitoring system 308 may also communicate with each individual user frustration monitoring and control system (user frustration monitoring and control system 1 100*a*, user frustration monitoring and control system 2 100*b*, . . . , user frustration monitoring and control system n 100*c*) via the network switch 307 to provide diagnostic test instructions, monitoring instructions or other data, programs, scripts or parameters to the respective user frustration monitoring and control system based on the particular diagnostic, monitoring or test data received from the respective user frustration monitoring and control system for its respective device.

For example, if user frustration monitoring and control system 2 100*b* detects user frustration resulting from jarring or hitting of the device to which it is affixed, the user frustration monitoring and control system 2 100*b* will run a diagnostic test to detect a failure, fail condition, or other malfunction and will capture relevant video, audio, IR and RF, and other relevant data and communicate this to the centralized monitoring system 308 along with data identifying or otherwise regarding the device. The centralized monitoring system 308 may analyze and interpret this data in response to receiving the data communicated from the user frustration monitoring and control system 2 100*b* or other request from the user frustration monitoring and control system 2 100*b*. The centralized monitoring system 308 may then send customized testing and monitoring data to the user frustration monitoring and control system 100*b* to further test and/or monitor the corresponding device to which it is affixed in a particular manner to catch the failure again, send particular commands to the user frustration monitoring and control system 2 100*b*, and/or create testing environment conditions for the corresponding device to reproduce the failure, or to perform other specified tests. The centralized monitoring system 308 may also compile all the raw testing and monitoring data of the user frustration monitoring and control systems (user frustration monitoring and control system 1 100*a*, user frustration monitoring and control system 2 100*b*, . . . , user frustration monitoring and control system n 100*c*) for further collective analysis, processing and reporting.

An Intranet monitoring system 309 may also be connected to network switch 307. The Intranet monitoring system 308 may also receive raw test result data from each user frustration monitoring and control system (user frustration monitoring and control system 1 100*a*, user frustration monitoring and control system 2 100*b*, . . . , user frustration monitoring and control system n 100*c*) and provide further analysis of the received test result data, and may be located in a different location or building on the customer premises 116 or facility (e.g., on a local area network or wide area network).

One or more remote monitoring systems (e.g., remote monitoring system 122*a* and remote monitoring system 122*b*) may also be in operable communication with each user frustration monitoring and control system (user frustration monitoring and control system 1 100*a*, user frustration monitoring and control system 2 100*b*, . . . , user frustration monitoring and control system n 100*c*) over a communication system 108 (e.g., the Internet) to which the network switch 307 is connected. In this manner, some or all of the testing and monitoring functionality can be controlled at locations remote from the location of the particular device being tested. For example, as shown in FIG. 1, the receiving device 118 may be located at customer premises 116 while the monitoring system may be located at the receiving device 118 manufacturing or other servicing facility, which may save a service technician from having to visit the customer premises 116. Also, the remote monitoring system 122a may be located at a content provider, program distributor or other service provider office or premises (e.g., cable or satellite television service provider) so that particular programming may be provided and other signals sent directly to the receiving device having the corresponding user frustration monitoring and control system over the satellite, cable or other network system in response to diagnostic, test and monitoring data received from the user frustration monitoring and control system.

Some or all of the functionality of the centralized monitoring system 308 may be present in the one or more remote monitoring systems 122a, 122b. Also, pre-programmed scripts may be downloaded to any particular user frustration monitoring and control system via the network switch 307 from a centralized monitoring system 308, intranet monitoring system 509, or one or more remote monitoring systems 122a, 122b over the communication system 108.

Figure 4:
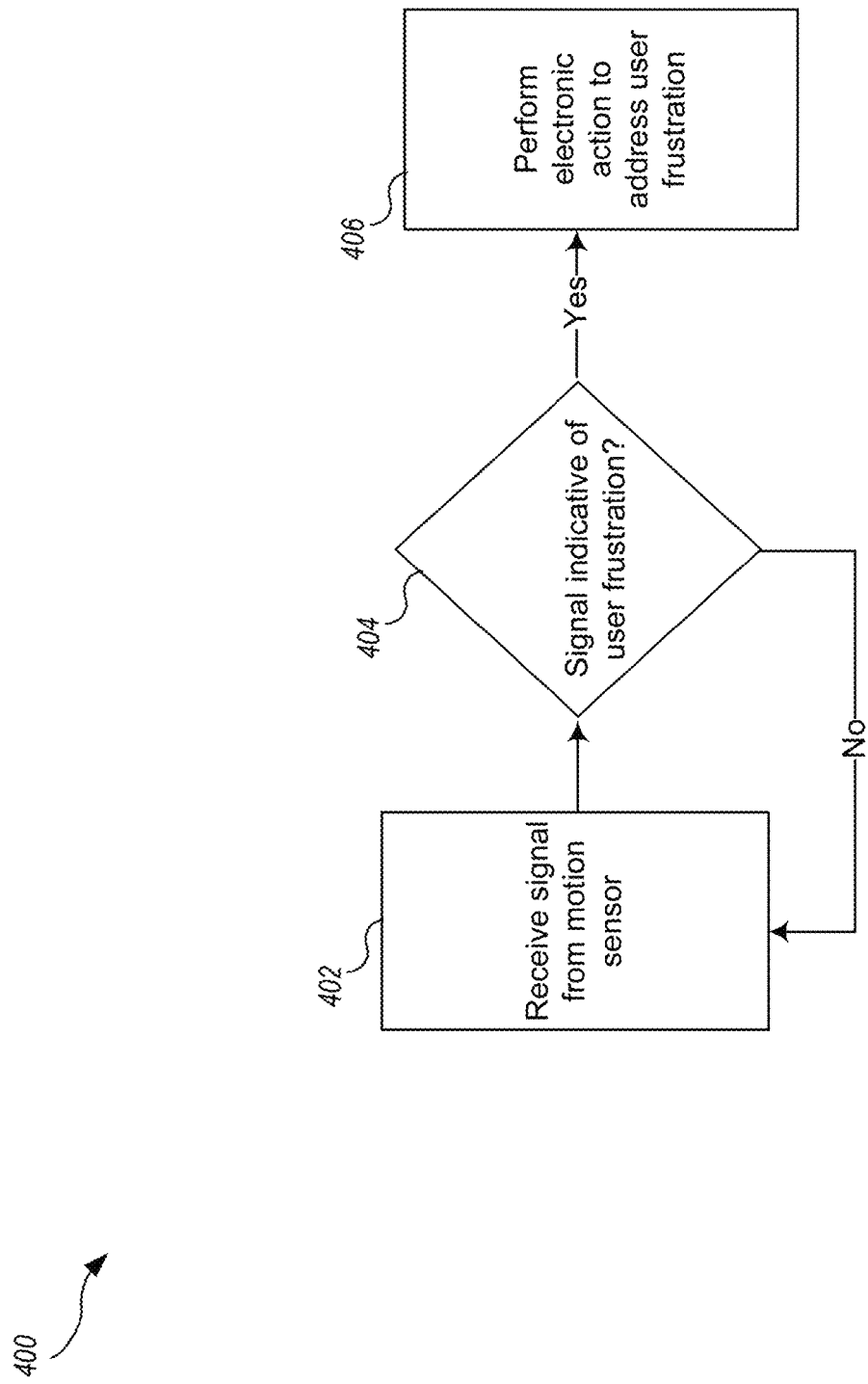
FIG. 4 is a flow diagram of an example method for detecting and responding to user frustration with electronic devices according to a first example embodiment.

FIG. 4 is a flow diagram of an example method 400 for detecting and responding to user frustration with electronic devices according to a first example embodiment.

At 402, the user frustration monitoring and control system 100 receives a signal from a motion sensor.

At 404, the user frustration monitoring and control system 100 determines whether the signal from the motion sensor is indicative of user frustration. For example, the user frustration monitoring and control system 100 may compare the measurement of the amount of dynamic acceleration indicated by the received signal to a threshold amount of dynamic acceleration and determine that the signal from the motion sensor is indicative of user frustration if the measurement of the amount of dynamic acceleration exceeds the threshold amount of dynamic acceleration.

At 406, if it is determined that the signal from the motion sensor is indicative of user frustration, the user frustration monitoring and control system 100 performs an electronic action to address user frustration, such as by running a diagnostic test or communicating helpful information to the user. In some embodiments, if it is determined that the signal from the motion sensor is indicative of user frustration, the user frustration monitoring and control system 100 may send a signal to a remote server that causes a warranty for the device in which the motion sensor is affixed to be voided or invalidated.

If it is determined that the signal from the motion sensor is not indicative of user frustration, the process returns to 402.

FIG. 5 is a flow diagram of an example method 500 for detecting and responding to user frustration with electronic devices according to a second example embodiment.

At 502, the user frustration monitoring and control system 100 receives a signal from a motion sensor and a microphone.

At 504, the user frustration monitoring and control system 100 determines whether an amount of dynamic acceleration represented by the signal received from the motion sensor is above a threshold amount. If it is determined that the amount of dynamic acceleration represented by the signal received from the motion sensor is not above the threshold amount, the process returns to 502.

At 506, if it is determined that amount of dynamic acceleration represented by the signal received from the motion sensor is above the threshold amount, then the user frustration monitoring and control system 100 determines whether the signal received from the microphone was received at the same time or otherwise coincides with the signal received from the motion sensor. If it is determined that the signal received from the microphone was not received at the same time and does not otherwise coincide with the signal received from the motion sensor, then the process returns to 502.

At 508, if it is determined that the signal received from the microphone was received at the same time or does coincide with the signal received from the motion sensor, then the user frustration monitoring and control system 100 determines whether the signal received from the microphone is indicative of user frustration, such as by analyzing the decibel level or other characteristics of the signal received from the microphone. If it is determined the signal received from the microphone is not indicative of user frustration, then the process returns to 502.

At 510, if it is determined that the signal received from the microphone is indicative of user frustration, then the user frustration monitoring and control system 100 communicates information to the user regarding determination of user frustration.

Figure 6:
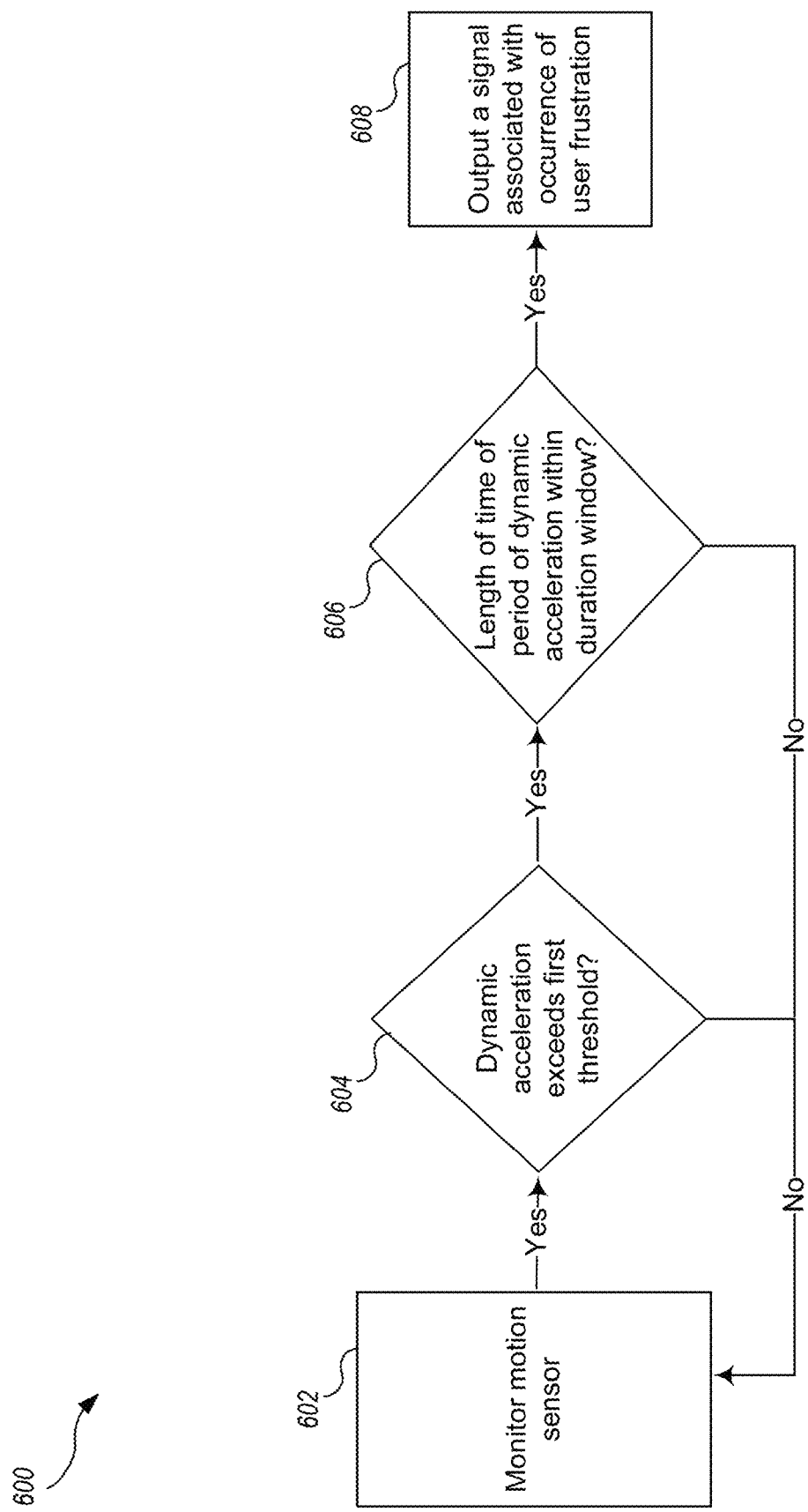
FIG. 6 is a flow diagram of an example method for detecting and responding to user frustration with electronic devices according to a third example embodiment.

FIG. 6 is a flow diagram of an example method 600 for detecting and responding to user frustration with electronic devices according to a third example embodiment.

At 602, the user frustration monitoring and control system 100 monitors a motion sensor.

At 604, the user frustration monitoring and control system 100 determines whether dynamic acceleration associated with the monitoring of the motion sensor exceeds a first threshold. If it is determined that the dynamic acceleration associated with the monitoring of the motion sensor does not exceed the first threshold, then the process returns to 602.

At 606, if it is determined that the dynamic acceleration associated with the monitoring of the motion sensor exceeds the first threshold, then the user frustration monitoring and control system 100 determines whether the length of time of the period of dynamic acceleration exceeds a second threshold. If it is determined that the length of time of the period of dynamic acceleration is not within a duration window, then the process returns to 602.

At 608, if it is determined that the length of time of the period of dynamic acceleration is within the duration window, then the user frustration monitoring and control system 100 outputs a signal associated with occurrence of user frustration. For example, this may be a signal that includes a diagnostic test, a command to run a diagnostic test, a communication including helpful information to the user, or an alert to another device that the user is experiencing frustration.

While various embodiments have been described hereinabove, it is to be appreciated that various changes in form and detail may be made without departing from the scope of the invention(s) presently or hereafter claimed.

The invention claimed is:

1. A method in a system for detecting user frustration with an electronic device, the method comprising:

determining, by at least one computer processor, whether the electronic device is in a mode to accept user input from other than a motion sensor of the electronic device;

determining, by at least one computer processor, whether a signal received from the motion sensor of the electronic device is indicative of user frustration based on the determination whether the electronic device is in a mode to accept user input and based on an amount of dynamic acceleration of the electronic device indicated by the signal received from the motion sensor of the electronic device;

in response to a determination that the electronic device is not in a mode to accept user input, determine that the electronic signal received from the motion is not indicative of user frustration;

in response to a determination by the at least one processor that the electronic device is in a mode to accept user input, determine that another electronic signal received from the motion sensor is indicative of user frustration based on an amount of dynamic acceleration of the electronic device indicated by the other signal received from the motion sensor of the electronic device; and in response to the determination by the at least one computer processor whether the signal received from the motion sensor of the electronic device is indicative of user frustration based on the determination whether the electronic device is in a mode to accept user input and based on an amount of dynamic acceleration of the electronic device indicated by the signal received from the motion sensor of the electronic device, communicating, by the at least one computer processor, information to the user regarding the determination whether the signal received from a motion sensor of the electronic device is indicative of user frustration.

2. The method of claim 1 wherein the determination whether the signal received from the motion sensor of the electronic device is indicative of user frustration is also based on a measured level of an audio signal received from a microphone of the electronic device at a same time the signal from the motion sensor of the electronic device is received.

3. The method of claim 2 wherein the signal received from the motion sensor of the electronic device and the audio signal received from the microphone of the electronic device, based on which the determination is made whether the signal received from the motion sensor of the electronic device is indicative of user frustration, is received by a monitoring server located remotely from the electronic device and is in communication with the electronic device over a communications network.

* * * * *